May 7, 1963 C. ROMÁN-GARCÍA 3,088,341
UNIVERSAL DRILL PRESS

Filed Aug. 15, 1961 2 Sheets-Sheet 1

INVENTOR
CARLOS ROMÁN-GARCÍA

BY Scrivener & Parker
ATTORNEYS

May 7, 1963 C. ROMÁN-GARCÍA 3,088,341
UNIVERSAL DRILL PRESS
Filed Aug. 15, 1961 2 Sheets-Sheet 2

INVENTOR
CARLOS ROMÁN-GARCÍA
BY Scrivener & Parker
ATTORNEYS

大3,088,341
Patented May 7, 1963

3,088,341
UNIVERSAL DRILL PRESS
Carlos Román-García, Torres 93, Ponce, Puerto Rico
Filed Aug. 15, 1961, Ser. No. 131,566
5 Claims. (Cl. 77—28)

This invention relates to drill presses, and more particularly to bench mounted drill presses having mounting means adapted to universally position a drill with respect to a work piece.

It is an object of this invention to provide a drill press for drilling both vertically and angularly disposed holes in a work piece.

It is another object of this invention to provide a universally adjustable drill press which is readily portable and is adapted for easy mounting and dismounting from a work bench.

Another object of this invention is to provide a universally adjustable drill press having a plurality of operating speeds.

Still another object of this invention is to provide a unversally adjustable, bench mounted drill press wherein the adjustments include movements in horizontal, vertical, and transverse planes with respect to the base or work table of said drill press as well as angular positioning of the drill about the individual axes of the three dimensional coordinate system.

Yet another object of this invention is to provide a universally adjustable, bench mounted drill press having simplicity of structure and design and is readily adaptable to perform on all kinds of materials.

These and other objects of this invention will become apparent with reference to the following specification and drawings which relate to a preferred embodiment of the invention.

Figure 1:
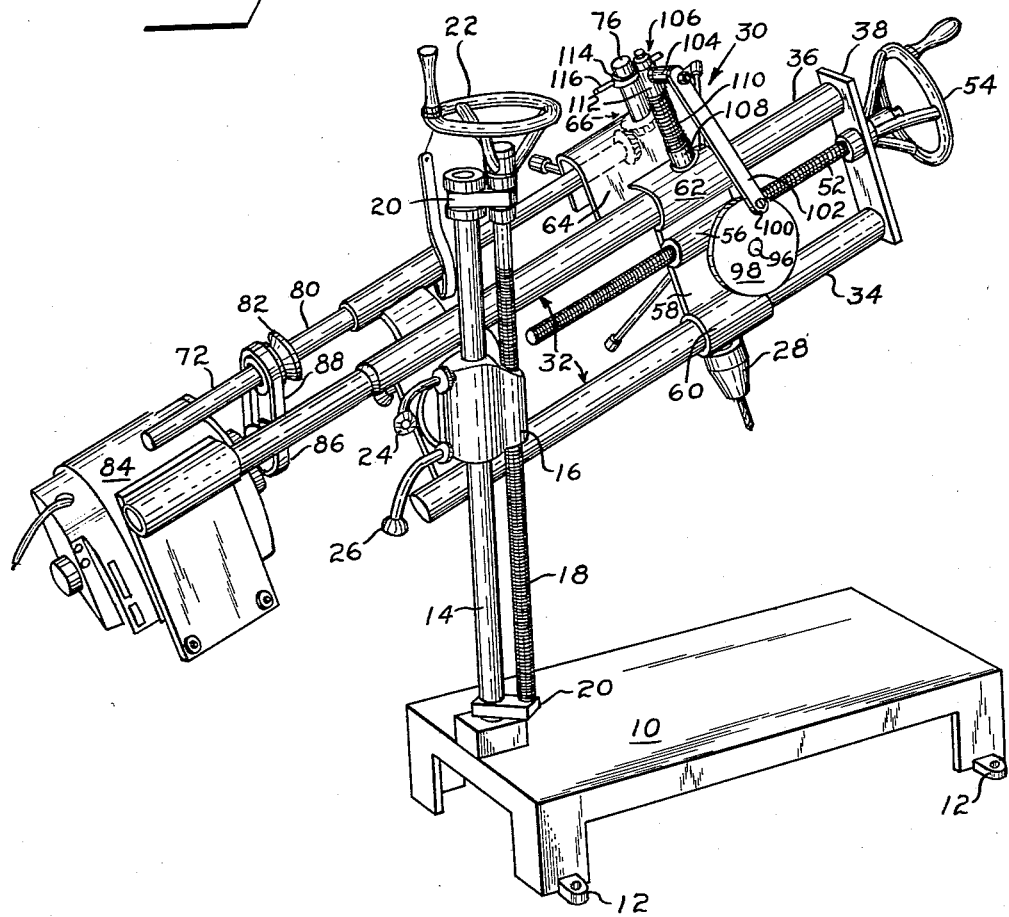
FIGURE 1 is a side elevation of the invention.

Referring in detail to the drawings, and more particularly to FIGURE 1, the drill press is shown mounted on a base 10 having tapped ears 12 or the like thereon adapted to be bolted down to a supporting surface or bench not shown.

A main supporting column 14 extends vertically from the upper surface of one end of the base 10 and provides a vertical reference axis for all movements in horizontal planes which are parallel with the upper surface of the base 10.

Movement in vertical planes, those perpendicular to the surface of the base 10, is provided bw means of a first sleeve 16 slidably mounted on the main column 14 and tapped to receive a first adjusting worm or elongated screw member 18 mounted on and parallel to the main column 14 by means of a pair of horizontally pivoted brackets 20 at either end of the main column 14. An adjusting wheel 22 is integrally mounted at the upper end of the first worm 18 to facilitate the vertical positioning of the sleeve 16 along the main column 14 by means of the first worm 18. A pair of hand screws 24 and 26 are provided for locking the first sleeve 16 in a desired position on the main support column 14.

Figure 2:
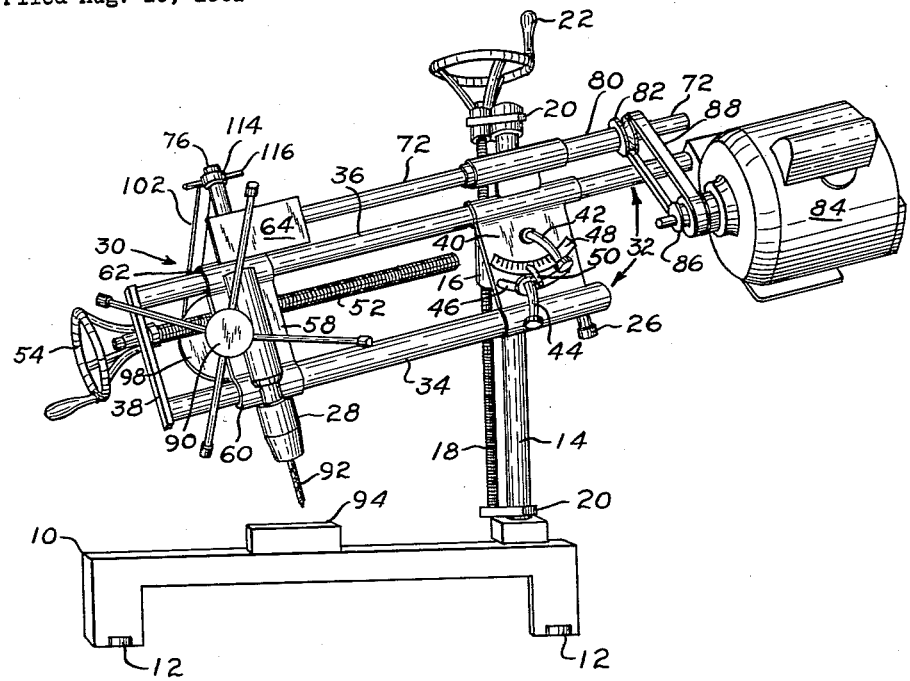
FIGURE 2 is a side elevation of the invention opposite to that of FIGURE 1.

Referring to FIGURES 1 and 2 jointly, and in particular to FIGURE 2, the drill chuck 28 and its main operating assembly generally indicated at 30 are mounted on a bifurcated beam 32 having a lower cylindrical member 34 and an upper cylindrical member 36.

The upper and lower cylindrical members are held together at one end by a plate 38.

The lower cylindrical member 34 is shorter than the upper member 36, and in the vicinity of the end of the lower member 34, the two cylindrical members 34 and 36 are mounted in a pivoted mounting plate 40 which is pivoted about a hand type pivot and lock screw 42 located at a substantially central position with respect to the first sleeve member 16 on the main support column 14. The entire bifurcated beam 32 may be readily adjusted about the pivot screw 42 through any desired arc in any given vertical plane about the main support column 14 to selectively position the axis of rotation of the drill chuck 28 at any desired angle with respect to the upper surface of the base 10.

A second hand type lock screw 44 is positioned below the pivot screw 42 and extends through an arcuate slot 46 cut in the mounting plate 40 to permit same to pivot about the screw 42. A calibrated plate 48 is affixed to the surface of the mounting plate 40 and cooperates with an indicating pointer 50 fixed to the first sleeve 16 and extending through the arcuate slot 46 to a point adjacent the calibrated plate 48 whereby the position of the bifurcated beam 32 may be selectively indexed. The plate 48 may be calibrated in degrees of angle between the upper surface of the base 10 and the axis of rotation of the drill chuck 28.

The entire drill assembly 30 may be selectively translated along the bifurcated beam member 32 by means of a second worm or elongated screw member 52 which passes from a hand wheel 54 through the end plate 38 on the bifurcated beam parallel to the upper and lower cylindrical members thereof, 30 and 34, respectively. The second worm 52 passes through an internally threaded sleeve 56 on the main mounting or second sleeved bracket 58 of the drill assembly 30. The bracket 58 has a pair of sleeves 60 and 62 thereon, cooperating with the lower and upper cylindrical members 34 and 36, respectively, of the bifurcated beam member 32.

Figure 3:
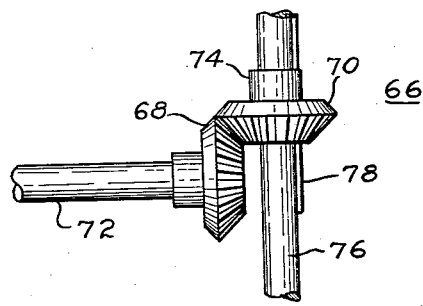
FIGURE 3 is a detail of a driving arrangement shown in dotted lines in FIGURE 1.

An additional guard area or drive housing 64 is provided adjacent the upper cylindrical beam member 36 integral with the sleeve bracket 58 which houses the driving connection 66 generally shown by dotted lines in FIGURE 2 and in detail in FIGURE 3 which drives the drill chuck 28.

Referring to FIGURE 3, the drive coupling 66 is shown to comprise a pair of bevel gears 68 and 70 which are the driving and driven members, respectively. The drive gear 68 is mounted on a rotary drive shaft 72. The driven gear 70 is positioned in driven relationship with the drive gear 68 by means of a hollow stub shaft or collar 74 which may be journalled in the guard portion 64 of the sleeved bracket 58 in any conventional manner.

The driven shaft 76 on which is mounted the drill chuck 28 is slidably mounted concentrically within the stub shaft or collar 74 of the driven gear 70 and is driven thereby through a keyed connection such as shown in FIGURE 3 by the elongated key member 78 running longitudinally of the chuck shaft 76.

The drive shaft 72, as shown in FIGURE 2, extends from the guard 64 parallel to the upper cylindrical beam member 36 through socket 78 in calibrated face plate 40. A second or driving sleeve portion 80 of the drive shaft 72 extends from the other end of the socket externally concentric and in a slidably keyed driving connection (not shown) with the main portion of the drive shaft 72. At the outer end of the driving sleeve 80 is a two-speed pulley 82 integral therewith. A drive motor 84 is mounted adjacent the pulley on the outer end of the upper cylindrical beam member 36. A second two-speed drive pulley 86 is also provided on the drive motor 84 to provide multiple operating speeds for the drill press. A belt 88 provides the driving connection between the two pulleys.

A star wheel 90 for controlling the movement of the drill chuck 28 and the drill 92 therein toward and away from a workpiece 94 such as shown in FIGURE 2 resting on the upper surface of the base 10, is rotatably mounted on the sleeved bracket 58 by means of a pin 96, shown in FIGURE 1. A flat disc 98 is mounted on the pin 96 for rotation therewith in response to the actuation of the star wheel 90.

An eccentric drive connection is provided in the form of a crank pin 100 and a crank arm 102 connected thereto adjacent the periphery of the disk 98. The crank arm 102 extends from the crank pin 100 upward to connect with one extremity 104 of a T-shaped spring-biased driving connection 106 for moving the chuck shaft 76 up and down through the stub shaft or collar 74 of the driven bevel gear 70.

A fixed stud 108 having a coiled compression spring 110 concentric therewith is mounted vertically on the sleeve portion 62 of the sleeved bracket 58. The stud is capped by a sleeve-shaped section 112 of the T-connection 104 which is held in place by the upper limit to the throw of the crank arm 102. The other extremity of the T-shaped connector 106 comprises a yoke 114 which is connected to the upper end of the chuck shaft 76 by a pin 116.

Operation

Referring to FIGURES 1 and 2, it is now seen that the drill press may be first adjusted in two degrees of freedom about the main support column 14.

The first degree of freedom is achieved by rotating the hand wheel 22 and causing the sleeve 16 and hence, the bifurcated beam 32 to travel vertically along the main column 14 in the direction desired by the action of the first worm 18.

The second degree of freedom is achieved by rotating the sleeve 16 and hence pivot the worm 18 on the pivoted brackets 20 whereby the bifurcated beam 32 is pivoted about the main support column 14 to position the drill 92 over a predescribed position on the base 10.

The lock screws 24 and 26 are now set and the preliminary adjustments are complete.

A third degree of freedom is now achieved by adjusting the angle of the bifurcated beam 32 and hence, that of the drill 92, with the upper surface of the base 10 by way of the calibrated face plate 48 on the pivoted bracket 40. The lock screws 42 and 44 are released, the desired calibrated angle is selected and the lock screws 42 and 44 are then set to maintain this angle.

A fourth degree of freedom is achieved by rotating the hand wheel 54 and thereby transating the drill mechanism 30 along the bifurcated beam 32 by the interaction of the second worm 52 and the threaded sleeve 56 on the sleeved bracket 58.

Finally, a fifth degree of freedom may be achieved as to the depth of the hole drilled. This is controlled by the manipulation of the star wheel 90 which causes the eccentric drive comprising the disk 98, crank pin 100 and crank 102 to depress the T-shaped connector 104 against the action of the spring 110 on the stud 108 to thereby drive the chuck shaft 76, chuck 28 and drill 92 down by the action of the yoke 114 and pin 116 on to T-connector 104. When the star wheel 90 is released, the spring 110 acting against the cap sleeve 112 on the T-connector 104 raises the chuck shaft 76, chuck 28 and drill 92 back to their initial position.

As can be seen from the foregoing specification and drawings this invention provides a universally adjustable, readily portable and readily mountable bench type drill press having five degrees of freedom of adjustment without incurring complexity of design and operation.

It is to be understood that the foregoing embodiment is submitted for the purpose of example only and is not intended to limit the scope of the appended claims.

What is claimed:

1. A drill press comprising a base having a flat working surface, a main support column extending vertically from said base perpendicular to said working surface, a substantially horizontal beam member adjustably mounted on said main support column by means having three degrees of freedom with respect to said working surface, said means comprising a sleeve slidably mounted on said main support column, a first worm means threadably coupled with said sleeve and pivotally mounted parallel to said column, and a calibrated plate centrally pivoted to said sleeve and carrying said beam member, said sleeve, plate and beam member being vertically adjustable along said column by said worm, said sleeve, worm, plate and beam being pivotally adjustable about said column, and said plate and beam being pivotally adjustable in vertical planes about said column to any pre-selected angle between said beam and said working surface, drive means mounted on said beam, and drill means driven by said drive means and adjustably mounted on said beam by means having two degrees of freedom with respect to said working surface, whereby a total adjustment of said drill press may be made having five degrees of freedom with respect to said working surface.

2. The invention defined in claim 1 wherein said calibrated plate includes an arcuate calibrated scale, an arcuate slot adjacent said scale and a pointer fixed to said main support column and extending therefrom through said slot to a position adjacent said calibrated scale whereby a preselected adjustment of the angle of said beam with respect to said working surface can be made.

3. A drill press comprising a base having a flat working surface, a main support column extending vertically from said base perpendicular to said working surface, a substantially horizontal beam member adjustably mounted on said main support column by means having three degrees of freedom with respect to said working surface, said means comprising a sleeve slidably mounted on said main support column, a first worm means threadably coupled with said sleeve and pivotally mounted parallel to said column, and a calibrated plate centrally pivoted to said sleeve and carrying said beam member, said sleeve, plate and beam member being vertically adjustable along said column by said worm, said sleeve, worm, plate and beam being pivotally adjustable about said column, and said plate and beam being pivotally adjustable in vertical planes about said column to any pre-selected angle between said beam and said working surface, drive means mounted on said beam, and drill means driven by said drive means and adjustably mounted on said beam by means having two degrees of freedom with respect to said working surface, whereby a total adjustment of said drill press may be made having five degrees of freedom with respect to said working surface, said means having two degrees of freedom with respect to said working surface comprises a second worm means, a sleeved mounting bracket threadably receiving said worm means and mounted on said beam for translatory movement thereon in response to rotation of said worm means to provide one of said two degrees of freedom, and a chuck shaft for said drill means mounted in said bracket for compound reciprocating and rotary motion toward and away from said working surface to provide the second of said two degrees of freedom.

4. The invention defined in claim 3 wherein said beam is a bifurcated member having upper and lower parallel arms, said upper arm being extended to support a drive motor, and a drive shaft parallel to said upper arm connected with said drive motor by a multi-speed driving means on one end thereof and connected by a bevel gear coupling to said chuck shaft at the other end thereof, said chuck shaft being slidably keyed into said bevel gear coupling to permit said compound reciprocating and rotary motion toward and away from said working surface.

5. The invention defined in claim 3 including means on said sleeved mounting bracket for reciprocating said chuck shaft comprising a hand actuated star wheel fixed to one end of a pivotally retained pin in said mounting bracket, a disk fixed to the other end of said pin for rotation therewith in response to rotation of said star wheel, a fixed stud on said mounting bracket parallel with said chuck shaft, a coiled compression spring concentrically mounted on said stud, a T-shaped member having a centrally located bore therein for receiving said stud and compressing said spring, one end of said T-shaped connector being attached to the upper end of said chuck shaft and the other end of said T-shaped connector being connected to said disk by an eccentric crank and pin arrangement whereby rotation of said disk in response to rotation of said star wheel, drives said T-shaped connector through said eccentric crank and pin arrangement to compress said spring about said stud and drive said chuck shaft down toward said working surface.

References Cited in the file of this patent

UNITED STATES PATENTS

| | | |
|---|---|---|
| 513,128 | Mill | Jan. 23, 1894 |
| 754,321 | Koeppen | Mar. 8, 1904 |

FOREIGN PATENTS

| | | |
|---|---|---|
| 102,916 | Great Britain | Jan. 4, 1917 |